(12) United States Patent
Chaubey et al.

(10) Patent No.: US 11,525,699 B2
(45) Date of Patent: Dec. 13, 2022

(54) RADAR VECTORING ENERGY MANAGEMENT GUIDANCE METHODS AND SYSTEMS

(71) Applicant: HONEYWELL INTERNATIONAL INC., Morris Plains, NJ (US)

(72) Inventors: Rajesh Chaubey, Bangalore (IN); Akshay Sankeshwari, Bangalore (IN); Sharanabasappa Advani, Bangalore (IN); Bhalakrishnan Janardhanan, Bangalore (IN); Roopa Niveditha Sundara Kulal, Bangalore (IN); Ravish Udupa, Bangalore (IN); Daniel E. Lewis, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 92 days.

(21) Appl. No.: 16/866,257

(22) Filed: May 4, 2020

(65) Prior Publication Data
US 2021/0254997 A1    Aug. 19, 2021

(30) Foreign Application Priority Data
Feb. 13, 2020    (IN) .............................. 202011006206

(51) Int. Cl.
*G01C 23/00* (2006.01)
*B64D 43/02* (2006.01)
*G01S 13/91* (2006.01)

(52) U.S. Cl.
CPC ........... *G01C 23/005* (2013.01); *B64D 43/02* (2013.01); *G01S 13/913* (2013.01)

(58) Field of Classification Search
CPC ...... G01C 23/005; B64D 43/02; G01S 13/913
See application file for complete search history.

(56) References Cited

U.S. PATENT DOCUMENTS 7,647,140 B2    1/2010    Demortier
8,184,020 B2    5/2012    He
(Continued)

FOREIGN PATENT DOCUMENTS

CN    109253730 A    1/2019

OTHER PUBLICATIONS

Itoh, Eri, et al., "Feasibility Study on Fixed Flight-Path Angle Descent for Wide-Body Passenger Aircraft," CEAS Aeronautical Journal, Oct. 25, 2018.

*Primary Examiner* — Kam Wan Ma
(74) *Attorney, Agent, or Firm* — Lorenz & Kopf, LLP

(57) ABSTRACT

Methods and systems are provided for guiding or otherwise assisting energy management of an aircraft radar vectoring en route to a runway. A method involves determining a predicted lateral trajectory for the radar vectoring in accordance with interception criteria, wherein the lateral trajectory comprises a sequence of segments for satisfying the interception criteria from a current location of the aircraft and each navigational segment of the sequence is associated with an anticipated aircraft heading assignment. The method determines a reference vertical trajectory corresponding to the lateral trajectory, determines a target value for an energy state parameter of the aircraft at the current location on the lateral trajectory using the reference vertical trajectory, and provides indication of a recommended action to reduce a difference between a current value for the energy state parameter and the target value.

20 Claims, 5 Drawing Sheets

(56) References Cited

U.S. PATENT DOCUMENTS

| | | |
|---|---|---|
| 8,527,173 B2 | 9/2013 | Lacoste et al. |
| 8,774,989 B1 | 7/2014 | Bush et al. |
| 8,781,654 B2 | 7/2014 | Giovannini et al. |
| 8,864,081 B2 | 10/2014 | Constans et al. |
| 8,892,275 B2 | 11/2014 | Constans et al. |
| 8,924,047 B2 | 12/2014 | Dewas et al. |
| 8,948,937 B2 | 2/2015 | Constans et al. |
| 9,536,435 B1* | 1/2017 | Shay .................. G05D 1/0005 |
| 9,646,503 B2 | 5/2017 | Kawalkar et al. |
| 9,709,991 B2 | 7/2017 | Bataillon et al. |
| 9,711,055 B2* | 7/2017 | Vesely .................. G05D 1/104 |
| 9,734,724 B2 | 8/2017 | Zammit et al. |
| 9,815,571 B1 | 11/2017 | Ogden et al. |
| 2016/0090193 A1 | 3/2016 | He et al. |
| 2017/0168658 A1* | 6/2017 | Lacko .................. G01C 23/005 |
| 2017/0358226 A1 | 12/2017 | Hodges et al. |
| 2018/0130363 A1* | 5/2018 | Yvetot .................... G01C 23/00 |
| 2018/0276999 A1* | 9/2018 | Dacre-Wright ...... G05D 1/0202 |
| 2018/0370645 A1 | 12/2018 | Durand et al. |
| 2021/0041242 A1* | 2/2021 | Miller .................... G01C 23/00 |

* cited by examiner

RADAR VECTORING ENERGY MANAGEMENT GUIDANCE METHODS AND SYSTEMS

PRIORITY

This application claims priority to India provisional application number 202011006206, filed Feb. 13, 2020, the entire content of which is incorporated by reference herein.

TECHNICAL FIELD

The subject matter described herein relates generally to vehicle systems, and more particularly, embodiments of the subject matter relate to aircraft systems capable of facilitating a stable approach to an airport by a radar vectored aircraft by displaying energy management indicia.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization, a standards organization or other regulatory body, an airline, an aircraft manufacturer, or the like. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and the like. Modern autopilot and/or flight management systems often leverage defined approach procedures to facilitate a stable approach.

However, in some instances, radar vectoring is utilized by ATC to manage traffic flow by instructing aircraft to deviate from predefined routes or procedures, for example, to achieve desired separation distances, aircraft sequencing, resolve potential conflicts between aircraft, and/or the like. Once the aircraft deviates from a predefined route or procedure using the assigned heading or vector provided by ATC, a pilot may lose situational awareness with respect to the energy state of the aircraft. For example, the pilot may lack awareness with respect to the upcoming lateral trajectory at which the aircraft will be vectored by the ATC, and thus, the pilot may also lack awareness of how the energy state of the aircraft should be managed while being vectored by ATC. Accordingly, it desirable to provide energy management guidance for radar vectored aircraft to improve situational awareness and facilitate stable approaches.

BRIEF SUMMARY

Methods and systems are provided for assisting energy management of an aircraft. One exemplary method involves identifying interception criteria for approaching a runway at an airport, determining a lateral trajectory in accordance with the interception criteria based at least in part on a current heading and a current location of the aircraft, wherein the lateral trajectory comprises a sequence of segments for satisfying the interception criteria from the current location of the aircraft and each navigational segment of the sequence is associated with an anticipated aircraft heading and a respective distance for the respective navigational segment, determining a reference vertical trajectory corresponding to the lateral trajectory using one or more criteria associated with the runway, determining a target value for an energy state parameter of the aircraft at the current location on the lateral trajectory using the reference vertical trajectory, and providing a graphical indication of a recommended action to reduce a difference between a current value for the energy state parameter of the aircraft and the target value.

In another embodiment, a method of assisting energy management of an aircraft radar vectoring en route to an airport involves obtaining, from one or more systems onboard the aircraft, a current aircraft location and a current aircraft heading, identifying interception criteria for alignment with a runway at the airport, determining a predicted lateral trajectory in accordance with the interception criteria based at least in part on the current aircraft heading and the current aircraft location, wherein the predicted lateral trajectory comprises a sequence of segments for satisfying the interception criteria from the current aircraft location and each segment of the sequence is associated with a respective aircraft heading predicted to be assigned to the aircraft, obtaining one or more energy management criteria associated with the runway, constructing a reference vertical trajectory corresponding to the predicted lateral trajectory that satisfies the one or more energy management criteria associated with the runway, determining a target value for an energy state parameter of the aircraft at the current aircraft location on the predicted lateral trajectory according to the reference vertical trajectory, and providing, on a display device onboard the aircraft, one or more graphical indicia influenced by a difference between a current value for the energy state parameter of the aircraft and the target value.

An embodiment of an aircraft system is also provided. The aircraft system includes a display device, a data storage element to maintain interception criteria, a navigation system to provide a current location of an aircraft and a current heading of the aircraft, and a processing system coupled to the display device, the data storage element and the navigation system to determine a lateral trajectory between the current location and a runway in accordance with the interception criteria based at least in part on the current heading and the current location of the aircraft, determine a reference vertical trajectory corresponding to the lateral trajectory using one or more criteria associated with the runway, determine a target value for an energy state parameter of the aircraft at the current location on the lateral trajectory using the reference vertical trajectory, and provide, on the display device, a graphical indication influenced by a difference between a current value for the energy state parameter of the aircraft and the target value.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
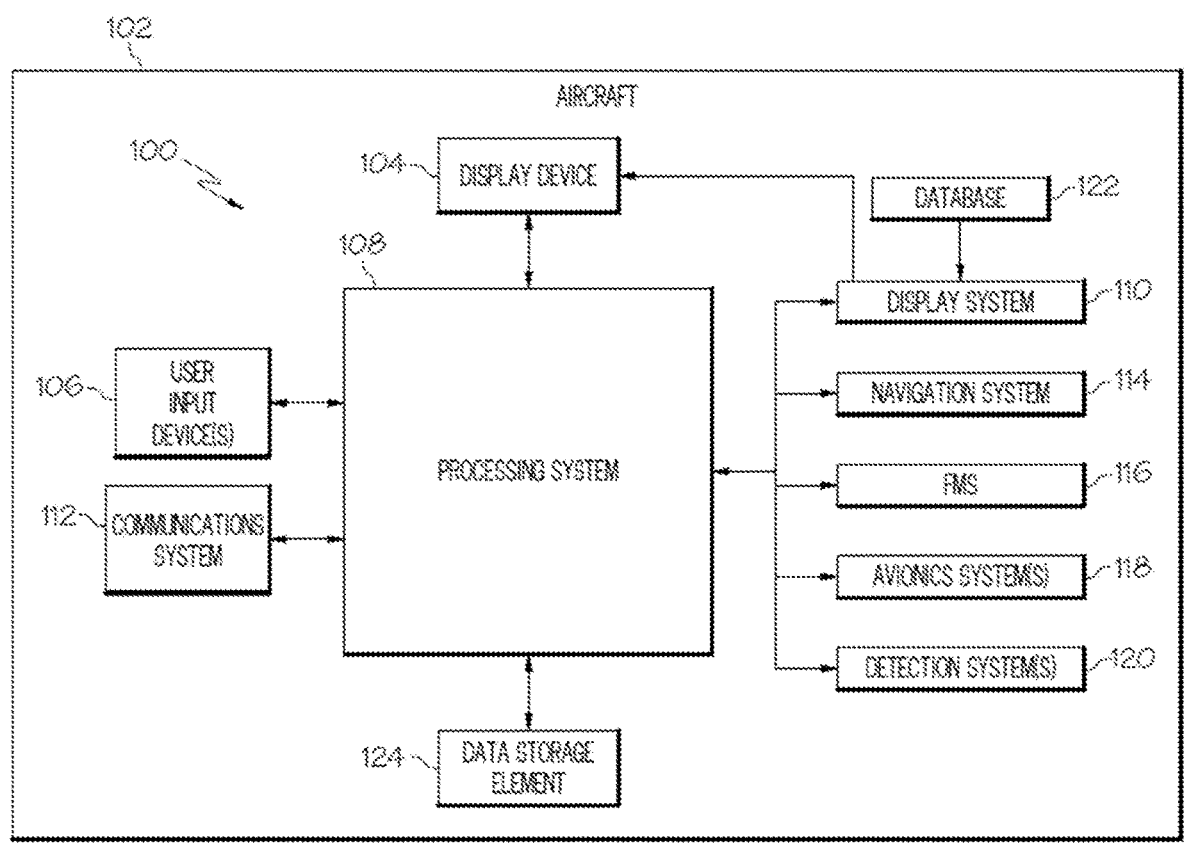
FIG. 1 is a block diagram of a system for an aircraft in an exemplary embodiment.

Embodiments of the subject matter described herein generally relate to systems and methods for managing energy of a vehicle en route to a destination. While the subject matter described herein could be utilized in various applications or in the context of various types of vehicles (e.g., automobiles, marine vessels, trains, or the like), exemplary embodiments are described herein in the context of an aircraft that is en route to an airport along a heading assigned by air traffic control (ATC), for example, in accordance with radar vectoring or other traffic management procedures or protocols.

As described in greater detail below primarily in the context of FIGS. 2-5, an anticipated lateral vectoring trajectory for approaching the runway from the current location of the aircraft given the currently assigned heading is determined in accordance with one or more runway interception criteria. The runway interception criteria may include, for example, a distance for defining a merge point (or approach gate) along the final approach course relative to a final approach fix (FAF), a desired angle for intercepting or approaching the merge point, and/or the like. The resulting lateral vectoring trajectory represents the predicted or anticipated vectoring trajectory to be provided by the ATC assigning or otherwise providing sequences of headings or turns at appropriate locations or distances to complete the route from the current location of the aircraft to the FAF. In exemplary embodiments, the lateral vectoring trajectory includes a sequence of navigational segments having associated headings, distances, and anticipated heading transition points (or turns) that define a route from the current location and heading of the aircraft to a final alignment with the runway in accordance with the interception criteria (e.g., intercepting the merge point at the desired angle) and represents a predicted or anticipated sequence of headings and turns that are expected to be assigned by the ATC in the future and the corresponding transition points or distances (or duration of flight) between assignments.

Based on the predicted lateral vectoring trajectory, a corresponding reference vertical trajectory for that predicted lateral vectoring trajectory is determined using one or more energy management criteria associated with the runway, such as, for example, any existing or applicable minimum and/or maximum altitude constraints associated with the final approach fix for the runway, any existing or applicable minimum and/or maximum airspeed constraints associated with the final approach fix, any existing or applicable minimum and/or maximum descent rate associated with the final approach fix, and/or the like. In this regard, various embodiments may include any number or type of energy management criteria, such as one or more of the stabilization criteria described in U.S. Patent Publication No. 2013/0218374, including, but not limited to, a desired target speed or a desired range of speeds upon reaching a stabilization target point, a threshold descent rate upon reaching a stabilization target point, a particular aircraft configuration upon reaching a stabilization target point, a particular aircraft power setting upon reaching a stabilization target point, etc.

For example, the reference vertical trajectory may include a sequence of one or more flight levels or altitude levels, airspeed values, descent rates (or descent speeds) and/or aircraft configurations that define a vertical profile or flight path backwards from the final approach fix to the current location of the aircraft along the lateral vectoring trajectory. In this regard, the reference vertical trajectory represents the recommended altitudes and speeds for the aircraft to observe while flying the predicted lateral vectoring trajectory to facilitate a stable approach and/or landing.

Once a predicted lateral vectoring trajectory and corresponding reference vertical trajectory are determined, a target value may be calculated or otherwise determined for one or more energy state parameters of the aircraft at the aircraft's current location along the lateral vectoring trajectory using the reference vertical trajectory. In this regard, based on the reference vertical trajectory, a target altitude value and/or a target airspeed value may be determined as the altitude and/or airspeed specified by the reference vertical trajectory at the aircraft's current distance from the runway (or FAF) along the reference vertical trajectory. By virtue of the reference vertical trajectory being constructed in accordance with energy management criteria associated with the runway, the target energy state parameter value represents a value for a respective energy state parameter at the current location of the aircraft that is likely to result in the aircraft satisfying one or more downstream criteria for that energy state parameter (e.g., a minimum and/or maximum value for that energy state parameter at the FAF), that is, the target value is aligned with the expected speed and altitude to be followed for a stable approach and landing at a given aircraft location on the predicted lateral vectoring trajectory according to the reference vertical trajectory. Based on a difference or deviation between the current or real-time value for an energy state parameter and the target value dictated by the reference vertical trajectory, one or more remedial actions for reducing the difference may be determined and a corresponding graphical indicia of such recommended action(s) may be provided (e.g., on a display device or via another user interface onboard the aircraft). In this manner, the pilot of a radar vectored aircraft is provided with guidance for how to manage the current energy state of the aircraft while traveling along an assigned heading.

In one or more exemplary embodiments, the predicted lateral vectoring trajectory, the reference vertical trajectory, and target energy state parameter values are dynamically determined as the aircraft travels to account for deviations in the ATC heading assignments relative to what was initially predicted or expected. For example, if the ATC instructs the aircraft to change headings earlier or later than originally anticipated or otherwise assigns a different subsequent heading than previously predicted, the predicted lateral vectoring trajectory and the reference vertical trajectory may be dynamically updated to reflect the current situation of the aircraft. The energy management guidance may then be correspondingly updated to facilitate energy management in accordance with the updated lateral vectoring trajectory.

Aircraft System Overview

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Energy Management Guidance for Radar Vectored Aircraft

Figure 2:
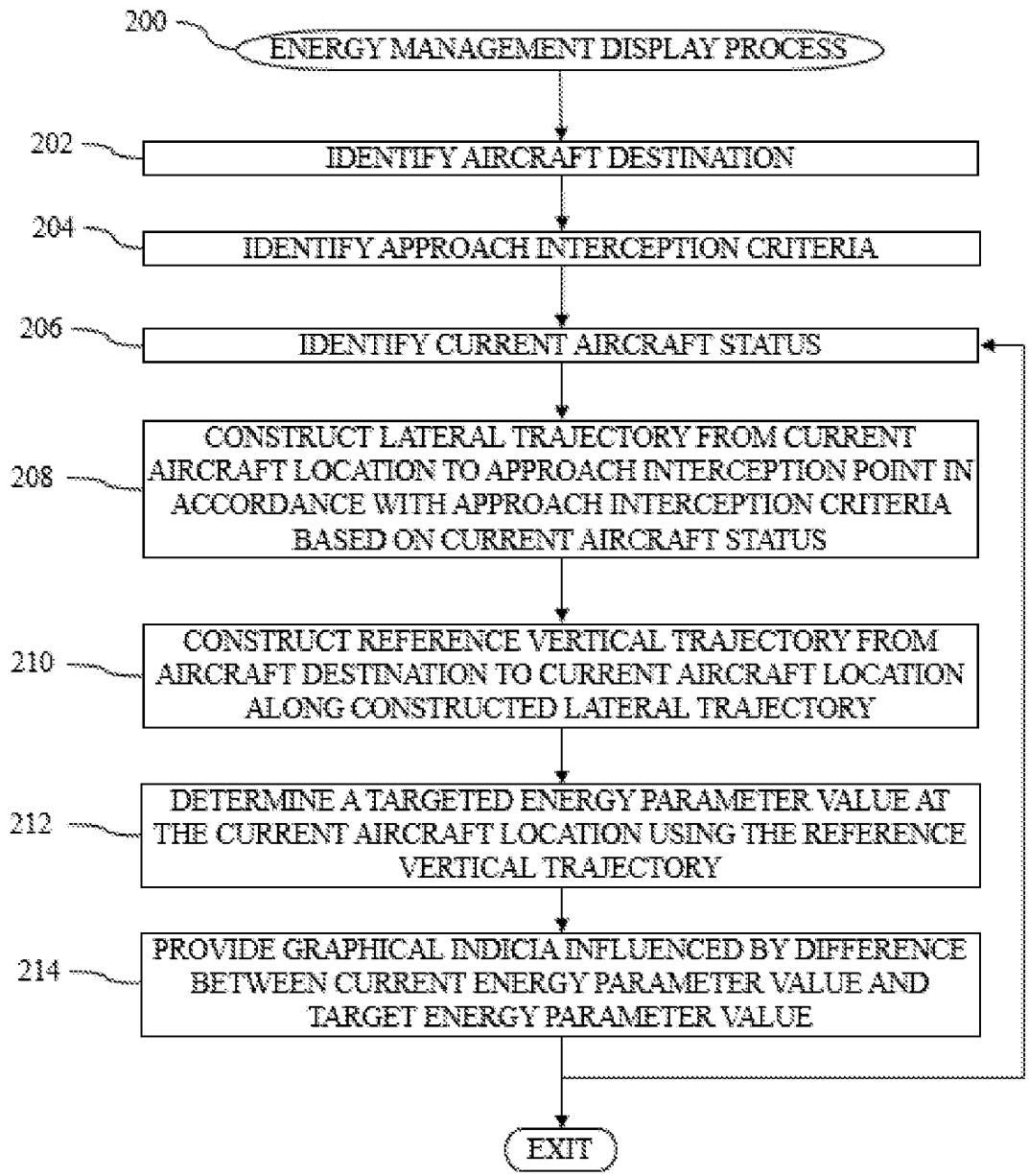
FIG. 2 is a flow diagram of an exemplary energy management display process suitable for use with the aircraft in the system of FIG. 1 in accordance with one or more embodiments.

Referring now to FIG. 2, in an exemplary embodiment, the aircraft system 100 is configured to support an energy management display process 200 to display, present, or otherwise provide graphical indicia facilitating execution of a stable approach and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the energy management display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the energy management display process 200 may include any number of additional or alternative tasks, the tasks need not be performed in the illustrated order and/or the tasks may be performed concurrently, and/or the energy management display process 200 may be incorporated into a more comprehensive procedure or process having additional functionality not described in detail herein. Moreover, one or more of the tasks shown and described in the context of FIG. 2 could be omitted from a practical embodiment of the energy management display process 200 as long as the intended overall functionality remains intact.

Referring to FIG. 2 with continued reference to FIG. 1, the illustrated energy management display process 200 initializes or otherwise begins by identifying the current destination for the aircraft (task 202). For example, based on the flight plan maintained by the FMS 116 or in an onboard data storage element 124, the processing system 108 may identify the destination airport for the aircraft and the runway the aircraft is intended to land on at the destination airport. In some embodiments, the energy management display process 200 may also identify the approach procedure associated with the destination runway that has been selected for the aircraft. In this regard, the approach procedure may identify or otherwise include navigational reference points (or waypoints) that define the route to be flown en route to the airport for landing at the desired runway. Additionally, in some embodiments, the approach procedure may define altitude criteria associated with one or more of the navigational reference points that may constrain the approach flight path (e.g., altitude minima or maxima). Accordingly, based on the selected runway at the destination airport and/or the selected approach procedure for the runway, the processing system 108 may identify or otherwise determine the geographic location of the runway, the heading or orientation of the runway, and a final approach fix or final approach point for the runway. In this regard, the final approach fix may be realized as one of the navigational reference points that defines the final segment of the selected approach procedure, that is, the navigational reference point closest to the runway.

The energy management display process 200 also identifies or otherwise determines one or more interception criteria for intercepting the final approach course or heading for the selected runway (task 204). In this regard, the interception criteria define the location and heading (or angle), projected from the interception point towards the current heading of the aircraft, at which it is anticipated the aircraft will engage the final approach course aligned with the runway before reaching the final approach fix. In exemplary embodiments, the interception criteria include an interception distance criterion defining a distance in advance of the final approach fix that defines the location of an interception point (or merge point) where the aircraft is expected to achieve alignment with the runway heading. In this regard, the interception point or merge point corresponds to the imaginary point (or approach gate) expected to be utilized by ATC when vectoring aircraft to the final approach course, which is located the specified interception distance from the final approach fix along the runway heading on the side of the final approach fix opposite the runway. The interception criteria also include an interception angle that defines the anticipated heading or angle of the final vectored segment en route to the interception point. In some embodiments, the interception criteria may be user-defined or otherwise configurable by a pilot or other user. For example, based on the pilot's knowledge or familiarity with a particular airport, the pilot may input or otherwise provide values for the interception distance and angle that reflect the pilot's previous operation at that airport. In other embodiments, the interception distance and angle may be fixed or otherwise set at predefined values defined by a standards organization or other regulatory body, an airline, an aircraft manufacturer, or the like. For example, by default, the interception distance may be set to one nautical mile in advance of the FAF and the interception angle may be set to 30° relative to the runway heading.

Still referring to FIG. 2, the energy management display process 200 continues by identifying or otherwise obtaining current status information pertaining to the aircraft (task 206). For example, the processing system 108 may obtain (e.g., from FMS 116, navigation system 114 and/or other avionic systems 118) the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration), and/or other instantaneous, real-time or recent values for one or more parameters that quantify the current operation of the aircraft 102. The processing system 108 may also identify or determine one or more current aircraft energy state parameter values using the current aircraft status information obtained from the onboard system(s) 114, 116, 118, such as, for example, the current aircraft speed value, the current aircraft altitude value, the current aircraft drag configuration, and/or the like. In some embodiments, the processing system 108 may calculate or otherwise determine an energy metric as a function of one or more current parameter values. For example, a total energy associated with the aircraft may be calculated as a function of the current aircraft speed, current aircraft altitude, and the current aircraft weight, which may be calculated or estimated based on the current amount of fuel remaining.

After identifying the current location and currently assigned heading for the aircraft, the energy management display process 200 constructs or otherwise generates a lateral vectoring trajectory for the aircraft from the current aircraft location and heading to the interception point of the runway in accordance with the interception criteria (task 208). In this regard, the lateral vectoring trajectory includes an initial segment aligned with the current aircraft heading, a final segment aligned with the runway heading, an interception segment aligned with the interception angle or heading relative to the final segment, and one or more additional intermediate segments between the initial segment and the interception segment. For example, the interception segment may be projected from the interception point along the interception angle or heading relative to the final segment towards the initial segment until intersecting the initial segment. Depending on the embodiment, based on the resulting angle between the interception segment and the initial segment, one or more intermediate segments may be constructed between the initial segment and the interception segment. In this regard, the intermediate segments account for the turning radius of the aircraft 102 to provide a feasible lateral vectoring trajectory that the aircraft 102 is capable of flying given the aircraft's current airspeed, the current aircraft configuration, and potentially other factors (e.g., meteorological conditions or the like). In practice, any number of rules or criteria may be defined that dictate the number and manner of constructing intermediate segments. For example, in one embodiment, the intermediate segments are required to have a minimum distance of one nautical mile and a maximum angle between headings of successive segments of 90°. For example, when the aircraft is flying towards the runway axis, the interception segment may be sufficient to establish a route to the interception point, in which case further intermediate segments may be unnecessary. However, when the aircraft is flying away from or parallel to the runway axis, one or more intermediate segments may be required to complete the route to the interception segment having the desired interception angle with respect to the runway.

Figure 3:
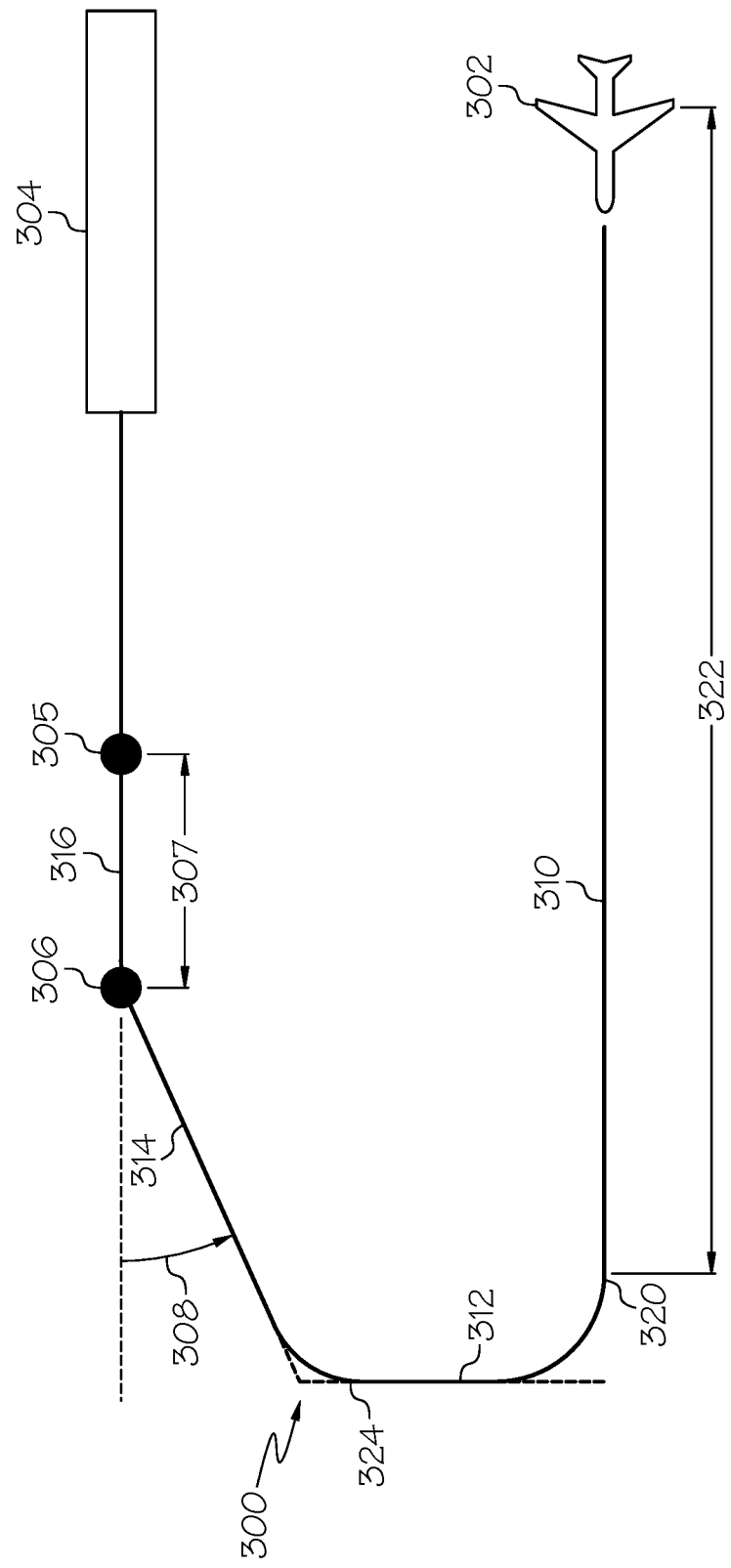
FIG. 3 depicts an exemplary predicted lateral trajectory that may be constructed in connection with the energy management display process of FIG. 2 in accordance with one or more embodiments.

FIG. 3 depicts an exemplary lateral vectoring trajectory 300 that may be constructed in accordance with the energy management display process 200 for radar vectoring from a current location of an aircraft 302 to a desired runway 304. In this regard, the lateral vectoring trajectory 300 intersects or intercepts the runway heading at an interception point 306 in advance of the FAF 305 for the runway by an interception distance criterion 307 at the desired interception angle 308 relative to the runway heading. To construct the lateral vectoring trajectory 300, an initial segment 310 aligned with the currently assigned aircraft heading is defined by projecting from the current aircraft location 302 along the assigned heading, and a final segment 316 aligned with the runway 304 and FAF 305 is defined between the interception point 306 and the runway 304. An interception segment 314 is projected from the interception point 306 at the interception angle 308 relative to the runway heading towards the projection of the initial segment 310. In this regard, when the angle between the heading associated with the initial segment 310 and the heading associated with the interception segment 314 is greater than 90°, an intermediate segment 312 is defined between the segments 310, 314 such that the angle between any two successive segments is less than or equal to 90°. In exemplary embodiments, after defining the heading for the intermediate segment 312, a transition point 320 for where the aircraft is expected to be vectored from the currently assigned heading to the intermediate segment heading is calculated or otherwise determined based on the current or anticipated aircraft speed. For example, the radius of a quarter turn (or 90°) arc between segments 310, 312 may be calculated or otherwise determined by multiplying the airspeed by a factor of 0.5%. In a similar manner, a second transition point 324 may be calculated or otherwise determined from the intermediate segment 312 to the interception segment 314 based on the expected airspeed along the intermediate segment 312. In one or more embodiments, the lengths of the segments 310, 312, 314 and the locations of the transition points 320, 324 are iteratively adjusted or determined to ensure the resulting lateral vectoring trajectory 300 complies with applicable route construction rules (e.g., minimum and/or maximum segment distances, minimum and/or maximum angles between successive segments, and/or the like). The resulting distance 322 between the transition point 320 and the current aircraft location 302 represents the expected distance or duration that the aircraft is expected to fly on the currently assigned heading until being vectored by the ATC to the heading associated with the intermediate segment 312.

Referring again to FIG. 2, in exemplary embodiments, after constructing a lateral vectoring trajectory in accordance with the interception criteria, the energy management display process 200 continues by constructing or otherwise generating a reference vertical trajectory corresponding to the constructed lateral vectoring trajectory (task 210). In exemplary embodiments, the energy management display process 200 retrieves or otherwise obtains one or more altitude, airspeed, or other criteria associated with the final approach fix or the runway and then calculates the reference vertical trajectory backwards from the runway in a manner that complies with the applicable criteria. For example, based on the selected approach procedure for the runway that was previously configured for the flight plan, the processing system 108 may obtain any minimum and/or maximum altitude criteria associated with the final approach fix, any minimum and/or maximum airspeed criteria associated with the final approach fix, any minimum and/or maximum descent rate criteria associated with the final approach fix, any required aircraft configuration at the final approach fix, and/or the like. The processing system 108 may also analyze the procedure information associated with the runway to identify a glideslope angle associated with the runway, and/or other parameters or criteria associated with the runway for defining the approach flight path for landing at the runway. The energy management display process 200 then constructs a vertical profile or flight path between the current altitude of the aircraft and the runway that complies with the various criteria associated with the runway, the final approach fix, or other stabilization points or navigational reference points expected to be traversed en route to the runway. In exemplary embodiments, the energy management display process 200 also identifies or otherwise determines one or more descent criteria for approaching the runway. For example, the energy management display process 200 may identify a desired flight path angle for descending to the airport, a desired descent rate, a desired thrust configuration for descent (e.g., idle descent), desired flap extension points or other aircraft configuration change points relative to the airport, and/or the like. In various embodiments, the energy management display process 200 also identifies or otherwise obtains forecasted or real-time meteorological information associated with the runway (e.g., via communications system 112), the current location of the aircraft (e.g., via an onboard detection system 120), or other navigational reference points or geographic areas relevant to the lateral vectoring trajectory so that the resulting reference vertical trajectory accounts for meteorological impacts on the descent of the aircraft 102 (e.g., wind speed and direction, etc.).

Figure 4:
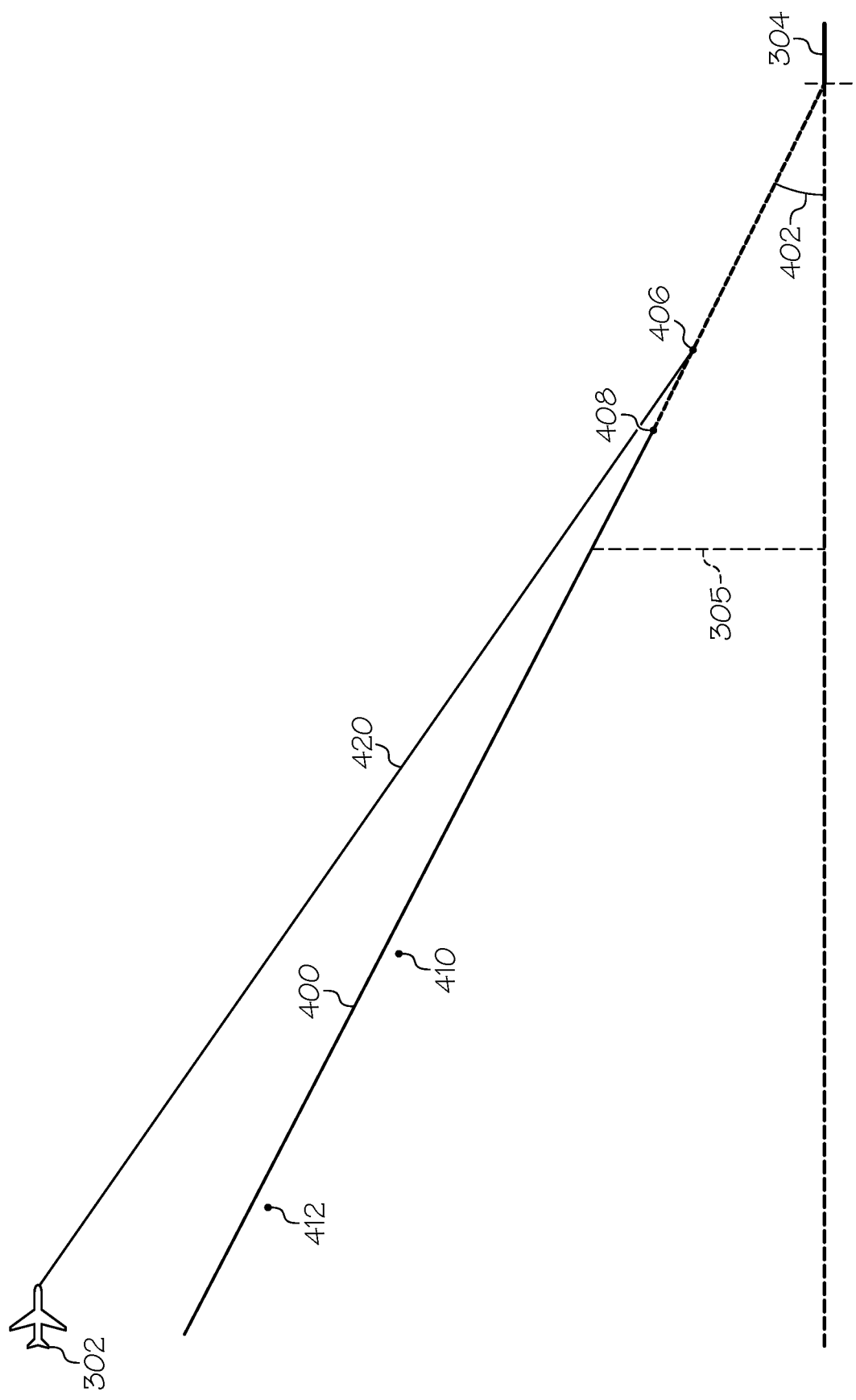
FIG. 4 depicts an exemplary vertical trajectory corresponding to a predicted lateral trajectory that may be constructed in connection with the energy management display process of FIG. 2 in accordance with one or more embodiments.

FIG. 4 depicts an exemplary reference vertical trajectory 400 that may be constructed in accordance with the energy management display process 200 for radar vectoring from a current location of an aircraft 302 to a desired runway 304. For example, the reference vertical trajectory 400 may be constructed backwards from the runway 304 with a reference flight path angle 402 corresponding to the angle of the glideslope associated with the runway 304 for the duration of the final segment 316 to be flown in alignment with the runway 304. The reference vertical trajectory 400 also complies with any applicable altitude, speed, and/or aircraft configuration constraints associated with the FAF 305 at the corresponding location within the reference vertical trajectory 400. The energy management display process 200 may then utilize the descent criteria (e.g., descent rate, flight path angle, thrust configuration, and/or the like) to continue constructing the reference vertical trajectory 400 backwards along the lateral vectoring trajectory 300 until reaching the current location of the aircraft 302. In this regard, depending on the current energy state for the aircraft, the reference vertical trajectory 400 may provide a different altitude, airspeed, aircraft configuration, and/or the like at the current location of the aircraft 302 relative to the current altitude, airspeed, aircraft configuration, and/or the like.

For example, FIG. 4 depicts the reference vertical trajectory 400 constructed backwards from the runway 304 with a fixed flight path angle 402 that satisfies a 1000 foot above ground level (AGL) approach stabilization altitude criterion 406 for maintaining a constant approach speed, the 1500 ft AGL altitude criterion 408 for checking altitude and airspeed for compliance with the 1000 ft AGL criterion 408, the descent speed limit altitude restriction 410, the Mach to calibrated airspeed (CAS) crossover altitude 412, and the like. The reference vertical trajectory 400 also satisfies applicable altitude, airspeed, and/or descent rate criteria associated with the FAF 305, and potentially other navigational reference points associated with a given approach procedure that are traversed by the corresponding lateral trajectory. Based on the current aircraft altitude and airspeed at the current aircraft location, in exemplary embodiments, the energy management display process 200 calculates or otherwise determines a recommended vertical trajectory 420 for intercepting the reference vertical trajectory 400 at or before the applicable altitude criterion or constraint closest to the airport 304 (e.g., the 1000 ft AGL stabilization altitude). For example, the energy management display process 200 may identify or otherwise determine a recommended vertical trajectory 420 having a constant descent flight path angle backwards from the location of the 1000 ft AGL stabilization altitude 406, and then based on the current aircraft altitude and airspeed, identify or otherwise determine one or more sequences of aircraft configuration changes (e.g., flap extension locations and extension positions, locations or distances for engaging the airbrake, and/or the like) to reduce the energy of the aircraft to satisfy the constant approach speed at the location of the 1000 ft AGL stabilization altitude 406.

Still referring to FIG. 2, in one or more embodiments, the lateral vectoring trajectory and reference vertical trajectory may be iteratively determined such that the transitions between segments of the lateral vectoring trajectory reflect the anticipated airspeed and/or aircraft configuration dictated by the reference vertical trajectory, such that the resulting lateral vectoring trajectory reflects the expected radar vectoring to be provided by the ATC for a stable approach that complies with the various altitude, airspeed, and/or other stabilization or energy management criteria for the approach to the desired runway. In this regard, the airspeeds specified by the reference vertical trajectory at different locations within the lateral vectoring trajectory influence the anticipated turning radius of the aircraft at those locations, which, in turn, influences the determination of the lateral vectoring trajectory, which, in turn, may influence the reference vertical trajectory.

After determining the anticipated lateral vectoring trajectory for the aircraft and the corresponding reference vertical trajectory for that anticipated lateral vectoring trajectory, the energy management display process 200 calculates or otherwise determines a target value for an energy state parameter at the current location of the aircraft according to the reference vertical trajectory and generates or otherwise provides one or more graphical indicia influenced by the target value (tasks 212, 214). In exemplary embodiments, the energy management display process 200 identifies the target altitude defined by the reference vertical trajectory at the current aircraft location (e.g., based on the current distance from the airport along the lateral vectoring trajectory) and provides a graphical indication of the difference between the target altitude and the current (or real-time) altitude of the aircraft. For example, the processing system 108 may provide a graphical representation of the difference between the current altitude and the target altitude for the current aircraft location. Similarly, the processing system 108 may identify a target airspeed defined by the reference vertical trajectory at the current aircraft location and provide a graphical representation of the difference between the current airspeed and the target airspeed.

In one or more embodiments, the processing system 108 also identifies or otherwise determines one or more recommended actions to reduce the difference between the current energy state parameter value and the target energy state parameter value. For example, when the current airspeed is greater than the target airspeed by more than a threshold amount, the processing system 108 may provide a graphical indication to the pilot that the speed brakes or air brakes should be applied to reduce the speed of the aircraft 102. Conversely, when the current airspeed is less than the target airspeed by more than the threshold amount, the processing system 108 may provide a graphical indication to the pilot that thrust should be applied to increase the speed of the aircraft 102.

Figure 5:
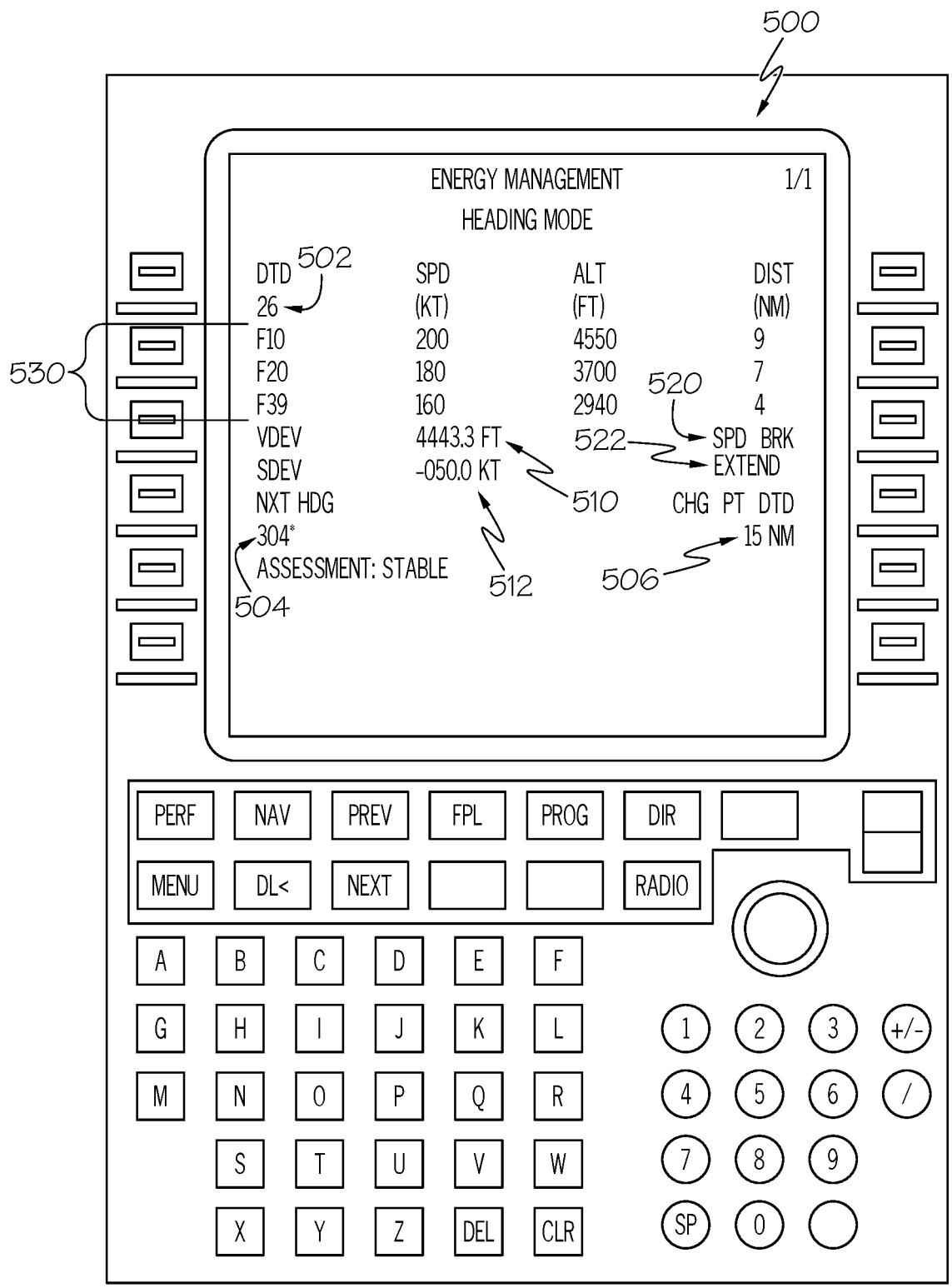
FIG. 5 depicts an exemplary radar vectoring guidance graphical user interface (GUI) display suitable for presentation on a display device in the aircraft system of FIG. 1 in conjunction with the energy management display process of FIG. 2 in accordance with one or more embodiments.

FIG. 5 depicts an exemplary radar vectoring graphical user interface (GUI) display 500 that may be presented on a display device 104 onboard an aircraft 102 in connection with the energy management display process 200 of FIG. 2. The radar vectoring GUI display 500 includes a graphical representation 502 of the lateral distance corresponding to the anticipated lateral vectoring trajectory 300 for the aircraft 102, 302 en route to the runway 304 along with a graphical representation 504 of the anticipated next heading to be assigned by the ATC (e.g., the heading associated with the next segment 312 following the current segment 310) when vectoring to the runway 304 and a graphical representation 506 of the relative location of (or the relative distance to) the transition point. In the depicted example, based on the current distance to destination 502 of 26 nautical miles and an anticipated distance to destination of 15 nautical miles at the next transition point, the pilot may estimate or otherwise ascertain the anticipated amount of distance (e.g., distance 322) or flight duration until the next radar vector heading is expected to be received from the ATC, thereby improving the pilot's situational awareness with respect to the lateral operation of the aircraft.

Additionally, the radar vectoring GUI display 500 includes a graphical indication 510 of the difference between the current aircraft altitude and the target aircraft altitude at the current distance to destination along the lateral vectoring trajectory along with a graphical indication 512 of the difference between the current speed of the aircraft and the target aircraft speed at the current distance to destination along the lateral vectoring trajectory, thereby improving the pilot's situational awareness with respect to the energy state of the aircraft 102. The radar vectoring GUI display 500 also includes graphical indicia 520, 522 of recommended actions for adjusting the current energy state of the aircraft 102 to reduce the difference between the current energy state and the target energy state according to the reference vertical trajectory. For example, the illustrated radar vectoring GUI display 500 includes a graphical indication 520 to apply the speed brake and a graphical indication 522 to extend the flaps. In this manner, the radar vectoring GUI display 500 provides guidance to facilitate the pilot managing the energy state of the aircraft to reduce the likelihood of a missed approach or go-around, increase the likelihood of a stable approach, and/or the like. In this regard, the graphical indicia 520, 522 of recommended actions may correspond to the recommended vertical trajectory 420 given the current deviation between the current aircraft energy state and the reference aircraft energy state according to the reference vertical trajectory 400.

In the illustrated embodiment, the radar vectoring GUI display 500 also includes graphical indicia 530 of the anticipated or recommended aircraft configuration changes according to the reference vertical trajectory. In this regard, the radar vectoring GUI display 500 provides indication of the relative lateral locations and corresponding altitudes and airspeeds at which the reference vertical trajectory anticipates, predicts, or otherwise recommends extending the flaps or making other configuration changes given the currently anticipated lateral vectoring trajectory, thereby improving the pilot's situational awareness with respect to upcoming configuration changes while radar vectoring.

Referring again to FIG. 2, in exemplary embodiments, the loop defined by tasks 206, 208, 210, 212 and 214 repeats throughout operation of the aircraft while radar vectoring to dynamically update the predicted trajectories as the aircraft travels. In this regard, when the ATC deviates from the original prediction by assigning a different subsequent heading and/or assigning the next heading at a different location than was previously predicted, the predicted lateral vectoring trajectory and corresponding reference vertical trajectory are dynamically updated to better reflect the behavior of the ATC and facilitate the pilot maintaining situational awareness with respect to the aircraft energy state as the ATC behavior varies from what was anticipated. Accordingly, the graphical indicia 502, 504, 506, 510, 512, 520, 522, 530 provided on the radar vectoring GUI display 500 may be dynamically updated as the aircraft energy state changes or the ATC behavior changes. Thus, the pilot's situational awareness and ability to manage the energy state of the aircraft while executing a radar vectored approach is improved.

It should be noted that in various embodiments, graphical representations of the predicted lateral vectoring trajectory and/or the corresponding reference vertical trajectory may be displayed or otherwise provided on a display device 104 onboard the aircraft 102 in connection with the energy management display process 200. For example, the predicted lateral vectoring trajectory 300 shown in FIG. 3 could be rendered or otherwise displayed on a lateral map display or other navigational display to provide the pilot with additional situational awareness or guidance with respect to the lateral route upon which it is anticipated the aircraft 102 while be radar vectored by ATC. Likewise, the reference vertical trajectory 400 shown in FIG. 4 could be rendered or otherwise displayed on a vertical profile display, a vertical situation display, or the like to provide the pilot with additional situational awareness or guidance with respect to the current vertical situation and energy state of the aircraft.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting energy management of an aircraft en route to an airport, the method comprising:
   identifying interception criteria for approaching a runway at the airport;
   determining a lateral vectoring trajectory for radar vectoring the aircraft from a current location of the aircraft to the airport to satisfy the interception criteria for approaching the runway based at least in part on the interception criteria, a current heading of the aircraft and the current location of the aircraft, wherein determining the lateral vectoring trajectory comprises determining an anticipated sequence of segments that are expected to be assigned by air traffic control from the current location of the aircraft, wherein each navigational segment of the anticipated sequence is associated with an anticipated aircraft heading expected to be assigned by air traffic control and a respective distance for the respective navigational segment until a transition point for a next aircraft heading assignment expected to be received from air traffic control;
   determining a reference vertical trajectory corresponding to the lateral vectoring trajectory using one or more criteria associated with the runway;
   determining a target value for an energy state parameter of the aircraft at the current location on the lateral vectoring trajectory using the reference vertical trajectory; and
   providing a graphical indication of a recommended action to reduce a difference between a current value for the energy state parameter of the aircraft and the target value.

2. The method of claim 1, wherein:
   determining the target value comprises determining a target altitude at the current location on the lateral vectoring trajectory according to the reference vertical trajectory; and
   providing the graphical indication comprises displaying the recommended action for reducing the difference between a current altitude of the aircraft and the target altitude.

3. The method of claim 1, wherein:
   determining the target value comprises determining a target speed at the current location on the lateral vectoring trajectory according to the reference vertical trajectory; and
   providing the graphical indication comprises displaying the recommended action for reducing the difference between a current speed of the aircraft and the target speed.

4. The method of claim 1, further comprising:
   identifying the transition point for the next aircraft heading assignment expected to be received from air traffic control in the future based on the lateral vectoring trajectory; and
   providing graphical indicia of at least one of the transition point and the next aircraft heading assignment.

5. The method of claim 1, wherein determining the reference vertical trajectory comprises determining a vertical flight path for the aircraft that satisfies an altitude criterion at a final approach fix within the lateral vectoring trajectory.

6. The method of claim 1, wherein determining the reference vertical trajectory comprises determining a vertical flight path for the aircraft that satisfies a speed criterion at a final approach fix within the lateral vectoring trajectory.

7. The method of claim 1, further comprising determining a location of an interception point along a final approach course relative to a final approach fix associated with the runway based at least in part on the interception criteria, wherein the lateral vectoring trajectory intersects the interception point.

8. The method of claim 7, wherein determining the reference vertical trajectory comprises constructing a vertical flight path for the aircraft backwards from the runway to the current location of the aircraft along the lateral vectoring trajectory that satisfies energy management criteria associated with the runway.

9. The method of claim 8, wherein the target value for the energy state parameter of the aircraft comprises a target altitude value or a target airspeed value at the current location of the aircraft that is likely to result in the aircraft satisfying the energy management criteria.

10. The method of claim 1, wherein the interception criteria comprise an interception angle that defines the anticipated aircraft heading of a final navigational segment of the anticipated sequence.

11. The method of claim 1, wherein:
    the interception criteria include an interception angle; and
    the lateral vectoring trajectory includes:
       an initial navigational segment aligned with the current heading of the aircraft;
       a final navigational segment aligned with a runway heading associated with the runway; and
       an interception navigational segment aligned with the interception angle relative to the final navigational segment.

12. The method of claim 11, wherein determining the lateral vectoring trajectory comprises determining one or more intermediate navigational segments between the initial navigational segment and the interception navigational segment.

13. A method of assisting energy management of an aircraft radar vectoring en route to an airport, the method comprising:
    obtaining, from one or more systems onboard the aircraft, a current aircraft location and a current aircraft heading;
    identifying interception criteria for alignment with a runway at the airport;
    determining a predicted lateral vectoring trajectory for radar vectoring the aircraft from the current aircraft location to the airport to satisfy the interception criteria based at least in part on the current aircraft heading and the current aircraft location, wherein determining the predicted lateral vectoring trajectory comprises determining an anticipated sequence of segments for satisfying the interception criteria that are expected to be assigned by air traffic control from the current aircraft location, wherein each segment of the anticipated sequence is associated with a respective anticipated aircraft heading predicted to be assigned by air traffic control to the aircraft and a respective distance for the respective segment until a transition point for a next aircraft heading assignment expected to be received from air traffic control;
    obtaining one or more energy management criteria associated with the runway;

constructing a reference vertical trajectory corresponding to the predicted lateral vectoring trajectory that satisfies the one or more energy management criteria associated with the runway;

determining a target value for an energy state parameter of the aircraft at the current aircraft location on the predicted lateral vectoring trajectory according to the reference vertical trajectory; and providing, on a display device onboard the aircraft, one or more graphical indicia influenced by a difference between a current value for the energy state parameter of the aircraft and the target value.

14. The method of claim 13, wherein providing the one or more graphical indicia comprises displaying a graphical representation of a recommended action to reduce the difference between the current value and the target value.

15. The method of claim 13, the interception criteria including an interception distance and an interception angle, wherein determining the predicted lateral vectoring trajectory comprises:

determining a location for an interception point relative to a final approach point associated with the runway using the interception distance;

determining an interception segment intersecting the interception point and having the interception angle with respect to a final approach course aligned with the runway; and determining one or more additional segments of the anticipated sequence of segments between the current aircraft location and the interception segment.

16. The method of claim 13, further comprising:

identifying the transition point for the next aircraft heading assignment expected to be received from air traffic control in the future based on the predicted lateral vectoring trajectory; and providing a graphical indication of at least one of a location of the transition point and the next aircraft heading assignment associated with the transition point.

17. An aircraft system comprising:

a display device;

a data storage element to maintain interception criteria;

a navigation system to provide a current location of an aircraft and a current heading of the aircraft; and a processing system coupled to the display device, the data storage element and the navigation system to determine a lateral vectoring trajectory between the current location and a runway in accordance with the interception criteria based at least in part on the current heading and the current location of the aircraft, wherein determining the lateral vectoring trajectory comprises determining an anticipated sequence of segments that are expected to be assigned by air traffic control en route to an airport from the current location of the aircraft for satisfying the interception criteria and each segment of the anticipated sequence is associated with an anticipated aircraft heading expected to be assigned by air traffic control and a respective distance for the respective segment until a transition point for a next aircraft heading assignment expected to be received from air traffic control, determine a reference vertical trajectory corresponding to the lateral vectoring trajectory using one or more criteria associated with the runway, determine a target value for an energy state parameter of the aircraft at the current location on the lateral vectoring trajectory using the reference vertical trajectory, and provide, on the display device, a graphical indication influenced by a difference between a current value for the energy state parameter of the aircraft and the target value.

18. The aircraft system of claim 17, wherein:

the interception criteria include an interception distance and an interception angle;

the data storage element maintains procedure information for an approach to the runway, the procedure information comprising a final approach point and one or more energy management criteria associated with the final approach point; and the processing system determines the lateral vectoring trajectory by:

determining a location for an interception point relative to the final approach point associated with the runway using the interception distance;

determining an interception segment intersecting the interception point and having the interception angle with respect to a final approach course aligned with the runway; and determining one or more additional segments of the anticipated sequence of segments between the current location and the interception segment.

19. The aircraft system of claim 17, wherein the graphical indication comprises a graphical indication of a recommended aircraft configuration change.

20. The aircraft system of claim 17, wherein the graphical indication comprises a graphical indication of the difference.

* * * * *